(No Model.)

A. PINOVER.
CHAIN ADJUSTING DEVICE.

No. 605,743. Patented June 14, 1898.

WITNESSES:
Donn Twitchell

INVENTOR
A. Pinover
BY
ATTORNEYS.

UNITED STATES PATENT OFFICE.

ALEXANDER PINOVER, OF NEW YORK, N. Y.

CHAIN-ADJUSTING DEVICE.

SPECIFICATION forming part of Letters Patent No. 605,743, dated June 14, 1898.

Application filed September 21, 1896. Serial No. 606,553. (No model.)

*To all whom it may concern:*

Be it known that I, ALEXANDER PINOVER, of New York, in the county and State of New York, have invented new and useful Improvements in Chain-Adjusting Devices, of which the following is a full, clear, and exact description.

This invention relates particularly to devices for adjusting the sprocket-chain of a bicycle or similar vehicle or for adjusting the distance between the sprockets; and the object is to provide a device for this purpose that may be easily and quickly operated, and, further, to construct the device of few and simple parts that may be rigidly held in place and not liable to get out of order.

I will describe a device embodying my invention, and then point out the novel features in the appended claim.

Reference is to be had to the accompanying drawings, forming a part of this specification, in which similar characters of reference indicate corresponding parts in all the figures.

Figure 1:
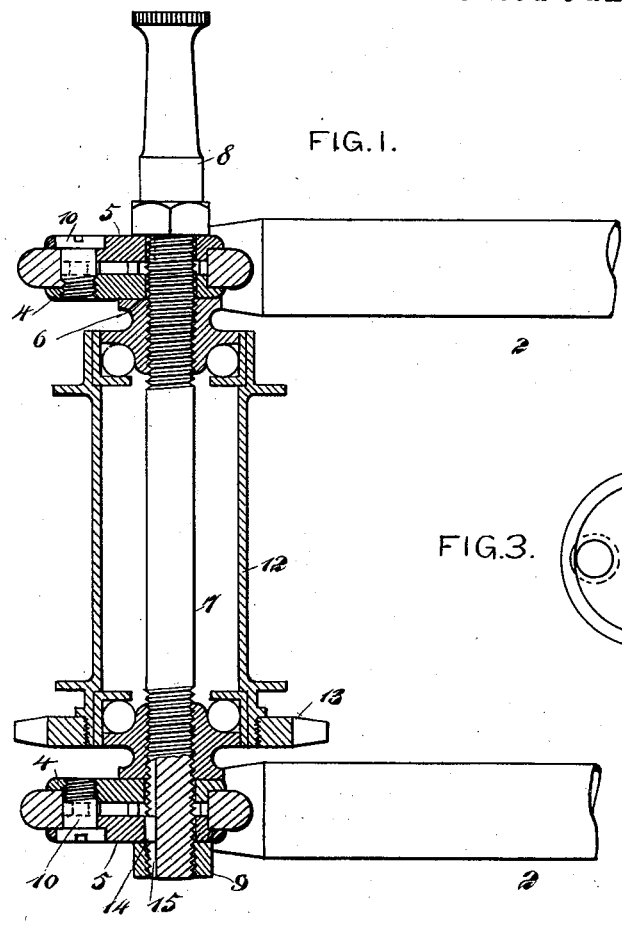
Figure 3:
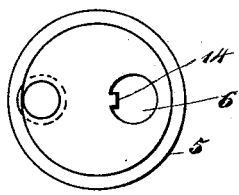
Figure 2:
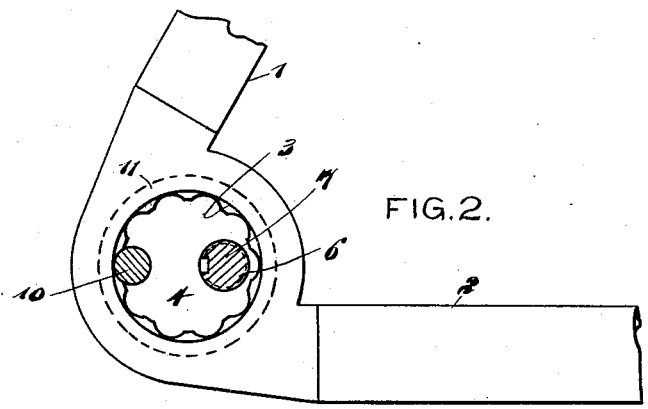

Figure 1 is a partial plan and partial section showing my invention. Fig. 2 is a side elevation with a section of an adjusting device removed, and Fig. 3 is an inside view of a section of an adjusting device.

Referring to the drawings, 1 designates a rear-fork member of a bicycle-frame, and 2 a lower brace connected therewith. The connection between the fork member and the brace is provided with a transverse opening 3, into which disks 4 and 5 are designed to engage. Each disk 4 5 is provided with an opening 6 eccentric to its center, the opening or hole in one disk registering with that in the other. Each disk has an annular flange to engage against the outer surface of the connection between the parts 1 and 2.

The adjusting-disks will of course be placed at each side of the wheel, and the ends of the shaft 7 will extend through the openings 6. One projected and threaded end of the shaft 7 may be engaged by the interiorly-threaded step 8, and the other projected threaded end may be engaged by a nut 9. By tightening the parts 8 and 9 it is obvious that the respective pairs of disks may be firmly clamped in place.

As a further means for clamping the disks 4 and 5 in place I may employ a screw 10, having its shank portion passing through a hole in the outer disk 5 and its tapped portion engaging in a tapped hole in the inner disk 4. I may employ a still further means for clamping the disks to prevent their rotation after adjustment, which is the following: It will be seen that the holes for the screw 10 are arranged near the periphery of the disks and that the wall of the opening 3 is provided at its center with an annular flange 11, provided with a series of closely-arranged transverse notches, in which a segment of the screw 10 may engage, as plainly shown in Fig. 2.

On the shaft 7 is mounted the hub 12 and the sprocket 13 in the usual manner. To prevent a rotary movement of the shaft 7 relatively to the disks 4 and 5, I may provide one or both of said disks with a feather 14 to engage in a groove 15 in the shaft.

It is obvious that to adjust the sprocket 13 rearward or forward to take up or loosen the chain the disks must be rotated in their bearings, and after adjustment they are to be clamped or fastened as before described. By taking hold of the step 8 the disks at each side of the wheel may be simultaneously operated.

Having thus described my invention, I claim as new and desire to secure by Letters Patent—

In a bicycle, a connection between the lower bar of the frame and a member of the rear fork, said connection having a circular opening, an annular flange on the wall of said opening intermediate of the sides of the connection, the said flange being provided with transverse notches, a pair of disks inserted in the opening, one at one side and the other at the other side of the connection, each disk having an annular flange bearing on the outer surface of its side of the connection and each disk having a hole eccentrically through it, and a screw passing through an opening in the periphery of one disk and engaging with a tapped opening near the periphery of the other disk, the said screw also engaging in one of the notches of the interior flange, substantially as specified.

ALEXANDER PINOVER.

Witnesses:
 JNO. M. RITTER,
 C. R. FERGUSON.